US007667868B2

(12) United States Patent
Hayashi et al.

(10) Patent No.: US 7,667,868 B2

(45) Date of Patent: Feb. 23, 2010

(54) OPTICAL SCANNING DEVICE AND IMAGE FORMING APPARATUS

(75) Inventors: Yoshinori Hayashi, Kanagawa (JP); Taira Kouchiwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 769 days.

(21) Appl. No.: 11/364,073

(22) Filed: Mar. 1, 2006

(65) Prior Publication Data

US 2006/0232659 A1 Oct. 19, 2006

(30) Foreign Application Priority Data

Mar. 31, 2005 (JP) ............................ 2005-103494

(51) Int. Cl.
*G06K 15/12* (2006.01)
*G06K 15/10* (2006.01)

(52) U.S. Cl. ...................... 358/1.7; 358/1.6; 359/204.2; 359/216.1

(58) Field of Classification Search .................. 358/1.1, 358/1.7, 1.9, 1.11–1.18, 1.5, 1.6, 1.8, 471, 358/481, 493; 359/204.1, 204.2, 204.3, 204.4, 359/204.5, 205.1, 216.1, 217.1, 217.2, 217.3, 359/217.4, 224.2; 347/233, 243, 244
See application file for complete search history.

(56) References Cited

FOREIGN PATENT DOCUMENTS

| | | |
|---|---|---|
| JP | 2001-083452 | 3/2001 |
| JP | 2002-023085 | 1/2002 |

*Primary Examiner*—Thierry L Pham
(74) *Attorney, Agent, or Firm*—Dickstein Shapiro LLP

(57) ABSTRACT

A light flux emitted from a light source is split into two by a light flux splitting unit, and these are respectively made incident on upper and lower tiers of polygon mirrors of a deflecting unit which coaxially rotates two polygon mirrors one on the other while being shifted in angles from each other. The respective light fluxes that have been deflected for scanning at mutually different timings by the deflecting unit respectively reach individual photodetectors through a first scanning lens, mirrors, and a second scanning lens as a predetermined light system and carry out main scanning.

7 Claims, 13 Drawing Sheets

OPTICAL SCANNING DEVICE AND IMAGE FORMING APPARATUS

CROSS-REFERENCE TO RELATED APPLICATIONS

The present document incorporates by reference the entire contents of Japanese priority document, 2005-103494 filed in Japan on Mar. 31, 2005.

BACKGROUND OF THE INVENTION

1. Field of the Invention

The present invention relates to an optical scanning device and an image forming apparatus used for a laser printer, a digital copying machine, and a plain-paper facsimile machine.

2. Description of the Related Art

Electro-photographic image forming apparatuses used for laser printers, digital copying machines and plain-paper facsimile machines have recently been developed from the view points of colorization and speedup, and specifically, tandem-compatible image forming apparatuses having a plurality of (usually, four) photoconductors have now come into widespread use. Although color electrophotographic image forming apparatuses can be of a system that has a sole photoconductor and rotates the photoconductor a number of turns which is equal to the number of colors (for example with four colors and one drum, it is necessary to turn the drum four turns), productivity is inferior.

However, in the case of a tandem system, an increase in the number of light sources is unavoidable, thereby causing a color drift due to a difference in the wavelengths between the plurality of light sources and a rise of cost due to an increase in the number of components.

In addition, deterioration in a semiconductor laser has been mentioned as a cause of a writing unit failure. When the number of light sources is increased, the failure probability is increased, and recyclability is deteriorated.

There is an example contrived not to increase the number of light sources in a tandem system, for example as disclosed in Japanese Unexamined Patent Application No. 2002-23085. In this example, by use of a pyramidal mirror or a flat mirror, beams from a common light source scan different scanning surfaces. However, by this method, although the number of light sources can be reduced, the number of deflecting mirror faces is limited to two at maximum, and thus, the problem of speeding up still remains.

In order to solve the problem, the present invention has been proposed to use polygon mirrors overlapped in two tiers with the phases shifted from each other as a means for scanning different scanning surfaces by beams from a common light source. There is a conventional art having a configuration similar to that of the present invention as disclosed, for example, in Japanese Unexamined Patent Application No. 2001-83452.

However, the ultimate purpose of this conventional art is to increase the scanning width, but not for scanning different scanning surface.

SUMMARY OF THE INVENTION

It is an object of the present invention to at least solve the problems in the conventional technology.

According to one aspect of the present invention, an optical scanning device includes: a plurality of light sources that are modulation-driven, each of which is made a common light source; a deflecting unit having a plurality of tiers of multi-facet reflecting mirrors on a common rotation axis; a light flux splitting unit that splits beams from the common light source and makes the split beams incident on mutually different tiers of reflecting mirrors of the deflecting unit; a plurality of surfaces to be scanned; a scanning optical system that guides the beams made to scan from the deflecting unit to the surfaces to be scanned; and light-receiving units that detect beams made to scan by the deflecting unit, so that the beams split from the common light source scan mutually different surfaces, wherein the mutually different tiers of multi-facet reflecting mirrors is shifted from each other in terms of angles in a rotating direction, and the following conditions are satisfied: $\theta/2<2\pi/M-\phi$, and $\theta/2<\phi$, and $\theta/2<2\alpha$, wherein $\theta$ indicates an angle of view including beams that reach the light-receiving units, $\alpha$ indicates an average incidence angle on the reflecting mirror at an effective scanning width, $\phi$ indicates an angle shift in a rotating direction between the different tiers of multi-facet reflecting mirrors, and M indicates a number of faces of the multi-facet reflecting mirror.

According to another aspect of the present invention, an image forming apparatus includes the above-disclosed optical scanning device, and is further provided with a plurality of image carriers corresponding to the respective surfaces to be scanned.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
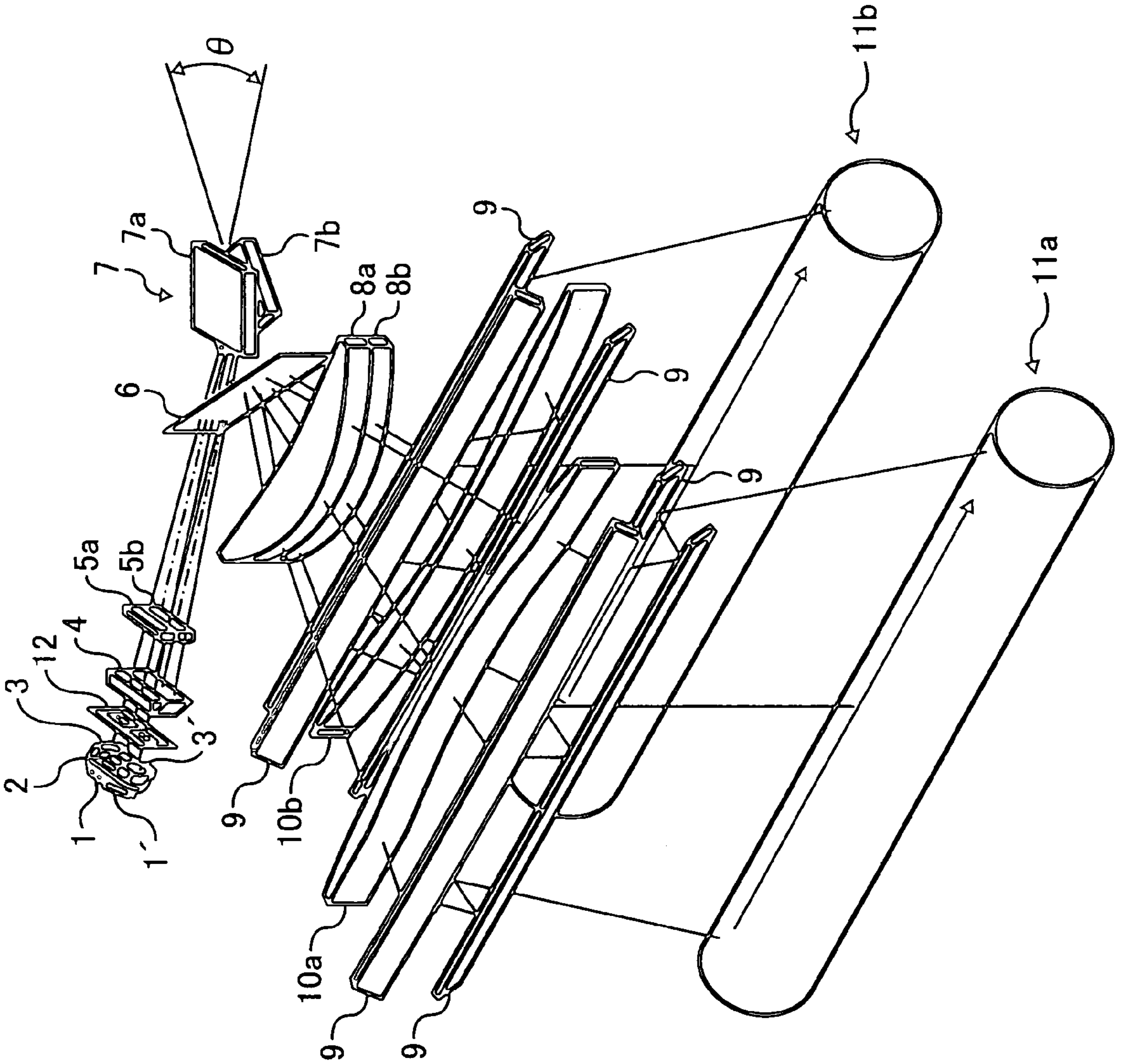
FIG. 1 is a schematic view showing a configuration of the present invention.

FIG. 1 is a schematic view showing a configuration of the present invention.

In the same figure, reference numerals 1 and 1' denote semiconductor lasers as light sources, reference numeral 2 denotes an LD (semiconductor laser diode) base, reference numerals 3 and 3' denote coupling lenses, reference numeral 4 denotes a half-mirror prism as a light flux splitting unit, reference numerals 5 and 5' denote cylindrical lenses, reference numeral 6 denotes soundproof glass, reference numeral 7 denotes a polygon mirror as a deflecting unit, reference numerals 8*a* and 8*b* each denotes a first scanning lens, reference numeral 9 denotes a mirror, reference numerals 10*a* and 10*b* each denotes a second scanning lens, reference numerals 11*a* and 11*b* each denotes a photoconductor as a surface to be scanned (which may be referred to just as a "scanning surface"), and reference numeral 12 denotes an aperture stop.

Each of two divergent light fluxes emitted from the semiconductor laser 1,1' are converted either to weak convergent light fluxes, parallel light fluxes, or weak divergent light fluxes by the coupling lens 3,3'. Beams that have exited the coupling lens 3, 3' pass through the aperture stop 12 for stabilizing the beam diameter on a scanning surface, and are made incident on the half-mirror prism 4. The beams from a common light source that have been made incident on the half-mirror prism 4 are split into upper and lower tiers, and the beams that are emitted from the half-mirror 4 are four beams in total.

Figure 2:
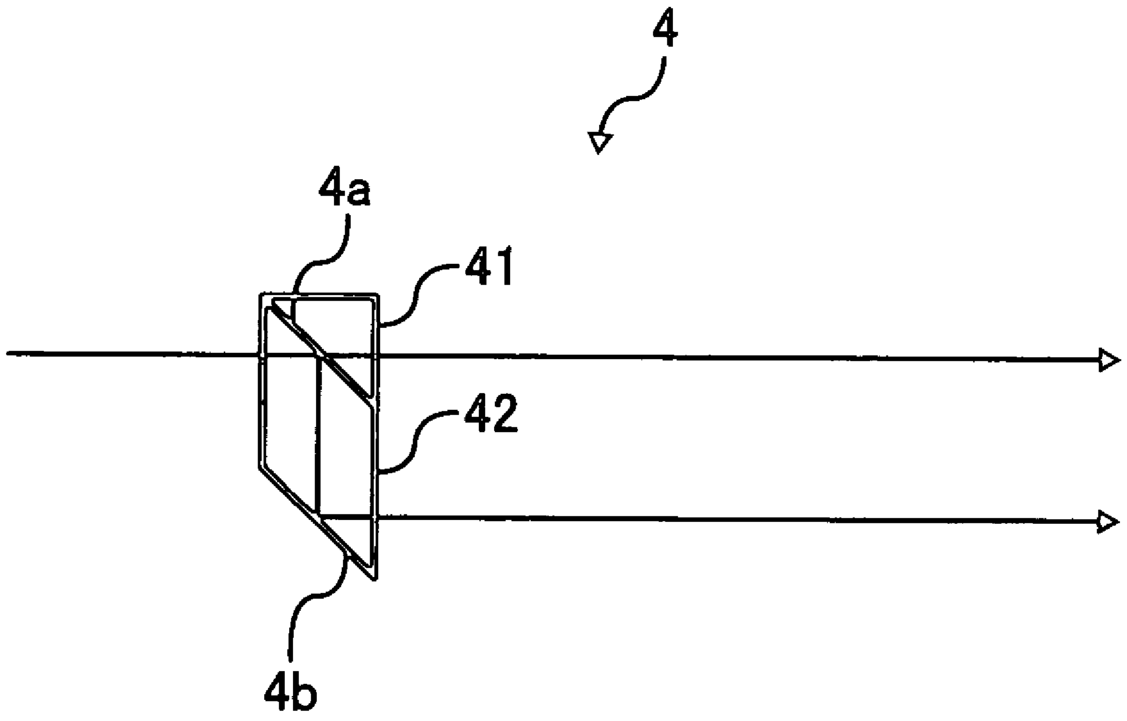
FIG. 2 is a sub-scanning sectional view of a half-mirror prism of an embodiment of the present invention.

FIG. 2 is a sub-scanning sectional view of a half-mirror prism of an embodiment of the present invention.

The half-mirror prism 4 functions as a light flux splitting unit and is composed of a part 41 whose section is a triangle and a part 42 whose section is a parallelogram. A bonding surface 4*a* between the parts 41 and 42 is a half-mirror, which splits light into a transmitted light and a reflected light at a ratio of 1:1. A surface 4*b* of the parallelogram part 42 opposed to the bonding surface 4*a* is of a total-reflection, which has a function to convert direction. Although a half-mirror prism is herein used as a light flux splitting unit, a single half-mirror and a normal mirror can be used to construct a similar system. It is not necessary that the ratio of splitting by the half-mirror is 1:1, and as a matter of course, it may be set so as to meet other optical system conditions.

The beams emitted from the half-mirror prism 4 are converted, by the cylindrical lenses 5 and 5' disposed at upper and lower tiers, respectively, to a line image elongated in the main-scanning direction in the vicinity of deflecting reflection surfaces. Here, for the deflecting unit 7, single polygon mirrors 7*a* and 7*b* are concentrically arranged at upper and lower tiers respectively, and shifted from each other for some angles in the rotating direction. Both polygon mirrors are of the same shape and are, in principle, made of arbitrary polygons. These are overlapped so that the apex of one of the polygons corresponds to an angle to divide the central angle of the other polygon almost equally into two. When, the apex of each one of the polygons is viewed from the apex of the other polygon adjacent clockwise, where central angles between both apexes to each other are provided as $\phi$ and $\phi'$ (provided that $\theta<\phi\leqq\phi'$), $\phi=\phi'$ is obtained if both have a symmetrical arrangement with respect to an arbitrary apex. Practically, since 4-facet polygon mirrors are easiest to use, 4-facet polygon mirrors are herein provided as $\phi=\phi'=45$ degrees. These $\phi$ and $\phi'$ are called shifting angles.

In this connection, the upper and lower polygon mirrors 7*a* and 7*b* may be integrally formed, or may be provided as separate bodies which are to be assembled later on.

In general, the shifting angle $\phi$ is, when both polygon mirrors have been equally shifted, where the number of faces of the polygon mirrors is provided as M, $\phi=2(2\pi/M)/2$, namely, $\pi/M$, is obtained. However, with an unequal shifting, when the smaller shifting angle is $\phi$, the greater shifting angle $\phi'$ becomes $\phi'=2\pi/M-\phi$.

Figure 3A:
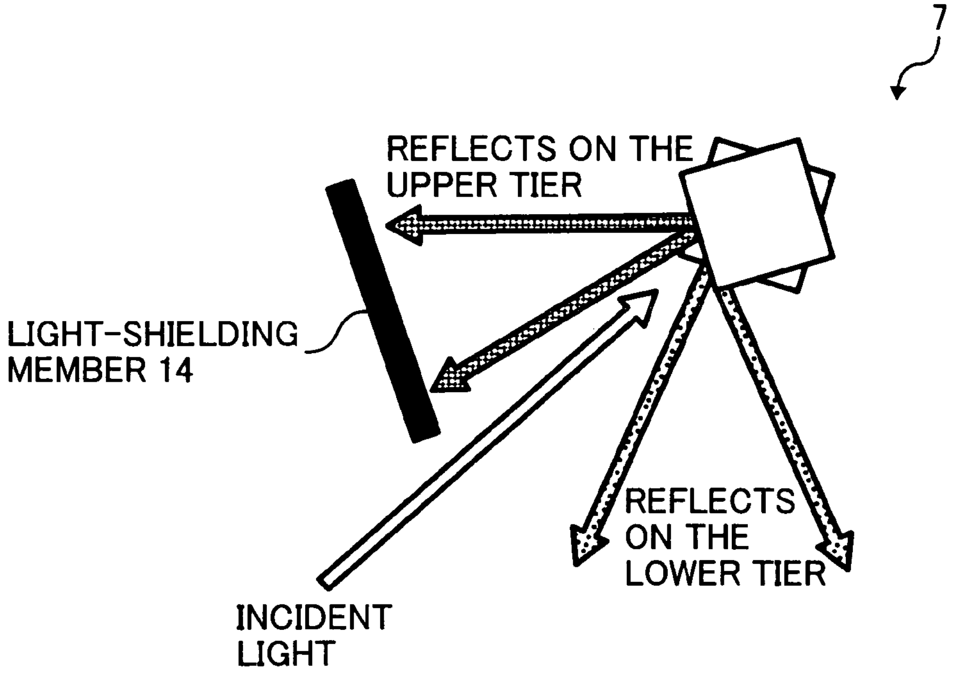
FIG. 3A and FIG. 3B are views for explaining optical scanning by a double-tiered polygon mirror.
Figure 3B:
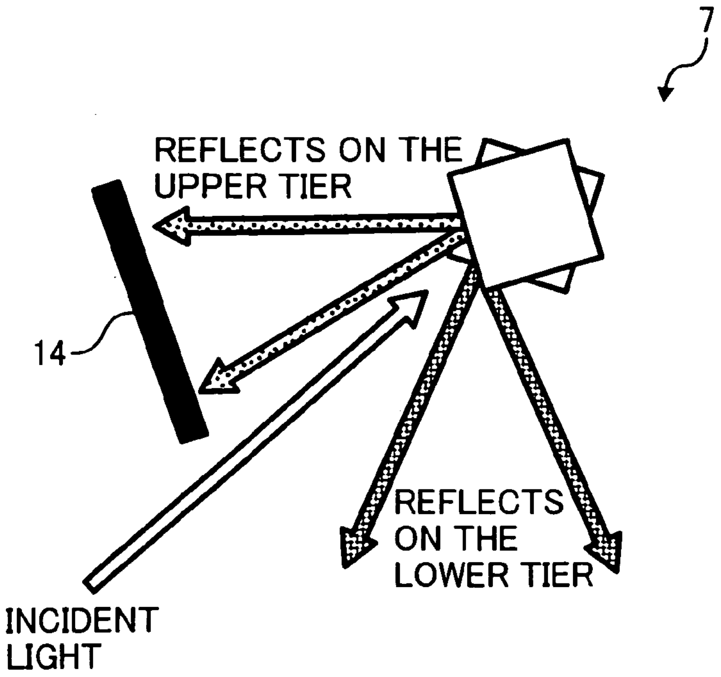

FIGS. 3A and 3B are views for explaining optical scanning by a double-tiered polygon mirror.

In the same figures, reference numeral 14 denotes a light-shielding member.

As shown in the same figures, when upper-tier beams from a common light source are scanning the photoconductor 11*a*, which is a scanning surface, lower-tier beams are made so that the beams do not reach the scanning surface, and are, desirably, shielded by the light-shielding member 14. In addition, when lower-tier beams are scanning the photoconductor 11*b* different from that of the upper-tier beams, upper-tier beams are made not to reach the scanning surface. Furthermore, for modulation drive as well, the timing is differentiated between the upper tier and lower tier, and when scanning the photoconductor 11*a* corresponding to the upper tier, a modulation drive of the light source is carried out based on image information of a color (for example, black) corresponding to the upper tier, while when scanning the photoconductor 11*b* corresponding to the lower tier, a modulation drive of the light source is carried out based on image information of a color (for example, magenta) corresponding to the lower tier.

Figure 4:
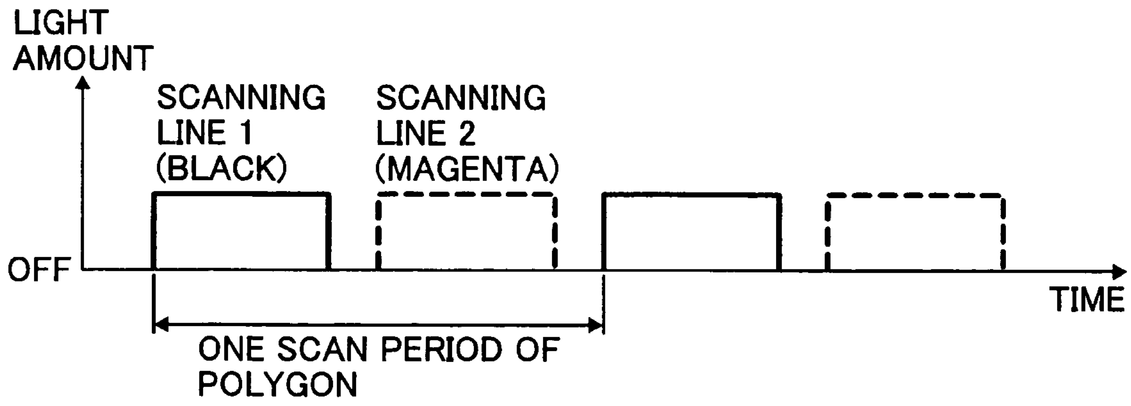
FIG. 4 is a timing chart of exposure for a plurality of colors.

FIG. 4 is a timing chart of exposure for a plurality of colors.

In the same figure, the vertical axis indicates the amount, while the horizontal axis indicates time.

A timing chart when an exposure for black and magenta is carried out by a common light source and also when the light source fully lights up for each color in an effective scanning area is shown in the same figure. The solid lines show parts correspond to black, while the dotted lines show parts correspond to magenta. Writing timings of black and magenta are determined based on a detection of scanning beams by a synchronous light-receiving unit disposed outside an effective scanning width. Here, although the synchronous light-receiving unit is unillustrated, a photodiode is usually used for the same.

Figure 5:
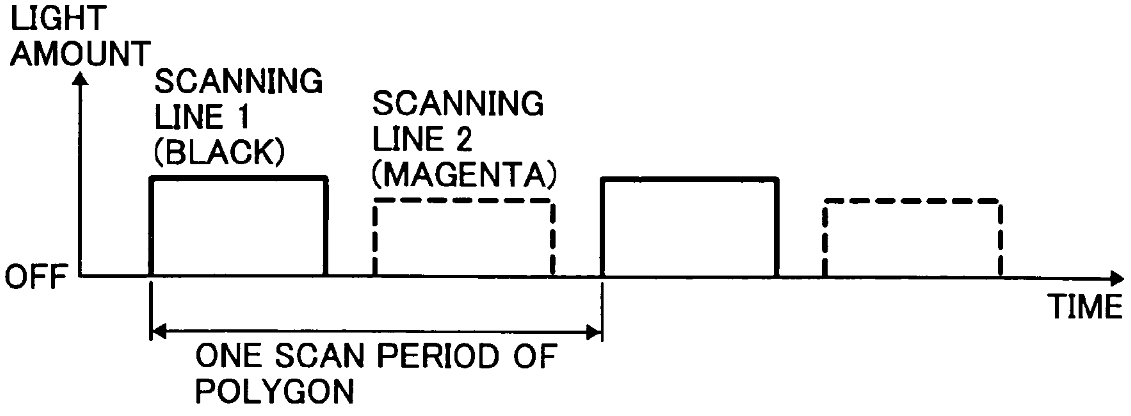
FIG. 5 is a timing chart for differentiating the amount of exposure according to colors.

FIG. 5 is a timing chart for differentiating the amount of exposure according to colors.

Although in FIG. 4 the amount of light in the black and the magenta areas are set to equal, in actuality, since transmissivity and reflectivity are different in each optical element, if the light amount of the light source is made to be the same, the light amounts of beams that reach the photoconductors are different. Therefore, as shown in FIG. 5, by differentiating beams in the setting light amount from each other when scanning different photoconductor surfaces, the light amounts of beams that can reach each of the photoconductor surfaces may be equalized.

Figure 6:
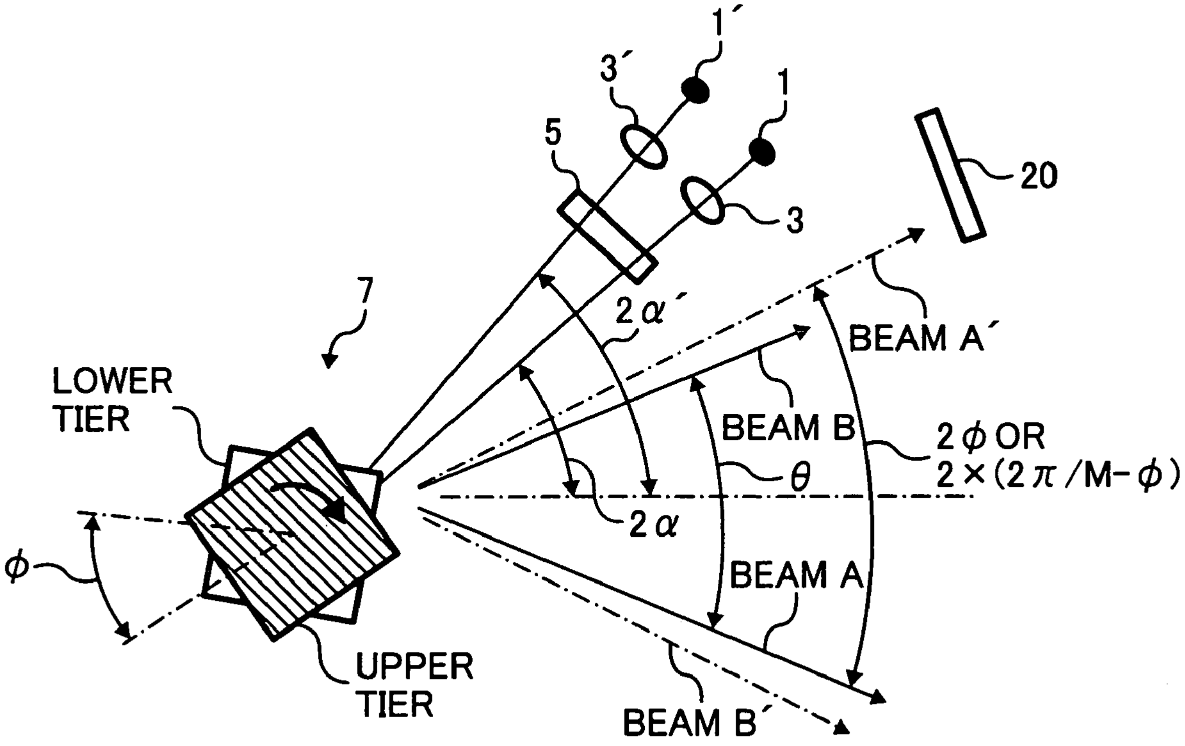
FIG. 6 is a view for explaining scanning angles of a polygon.

FIG. 6 is a view for explaining scanning angles of a polygon.

In the same figure, reference symbols $\alpha$ and $\alpha'$ denote average incidence angles on reflecting mirrors at an effective scanning width, $\theta$ denotes an angle of view including synchronous light-receiving units, and $\phi$ denotes one of the angle shifts in a rotating direction of the reflecting mirrors of different tiers (upper and lower tiers).

Usually, only a light-receiving unit that detects beams before an effective scanning width is exposed by beams is often disposed, however, in order to obtain information for a magnification correction of the scanning width, beams are sometimes detected after an effective scanning width has been exposed. In this case, provided is an angle of view including beams that reach light-receiving units before and after scanning is started.

In the same figure, the deflecting unit is rotating clockwise at equal angular velocity.

First, for separating incident beams on the deflecting unit from beams equivalent to an angle of view in a deflecting rotation plane, it is necessary to satisfy $$\theta/2<2\alpha \quad (1)$$

Herein, a beam A in the figure is a beam at the most peripheral angle of view on a scanning end side, and this is herein provided as a beam deflected by the upper-tier (hatched) reflecting mirror. At this time, it is necessary to make a beam A' emitted from a light source common to the upper-tier beam and reflected by the lower-tier reflecting mirror so that the scanning surface is not exposed by the beam A'. An angle formed between the beam A' and beam A shows $2\phi$ or $2\times(2\pi/M-\phi)$, and in order to prevent the beam A' from scanning the scanning surface, it is necessary to make the beam A' be located outside the effective width including the synchronous light-receiving unit.

Namely, it is necessary to provide $$\theta<2\phi \text{ or } \theta<2\phi \quad (2)$$

and $$\theta<2\times(2\pi/M-\phi) \text{ or } \theta/2<\pi/M-\phi \quad (3)$$

Here, reference symbol M denotes a number of faces of the polygonal reflecting mirror. At this time, it is sufficient to shield the beam by a light-shielding member 20 as shown in the figure.

A beam B in the figure is a beam at the most peripheral angle of view on a scanning start side, while for a beam B' emitted from a light source common to the upper-tier beam and reflected by the lower-tier reflecting mirror, it is necessary that the scanning surface is not exposed by the beam B', and similarly, it is necessary to satisfy the expressions (2) and (3) as shown above.

In the two expressions, although $2\pi/M-\phi$ and $\phi$ may be different from each other, a condition to take the maximum $\theta$ is when $$2\pi/M-\phi=\phi \quad (4),$$

namely, $\phi=\pi/M$ is provided, and at this time, $$\theta<2\times\pi/M \quad (5)$$

is provided, where M=4, the angle of view $\theta$ is less than $\pi/2$ radians (90 degrees).

By satisfying the expression (4), a wide effective scanning width can be secured, therefore, it is possible to suppress generation of ghost light.

In the same figure, a plurality of beams are made incident on the common reflecting mirror, and in this case, it is necessary that all the beams satisfy the condition of expression (1).

In other words, $\theta/2<2\alpha$ and $\theta/2<2\alpha'$ are provided. By satisfying these conditions, a plurality of scanning lines can be formed on an identical scanning surface by one time of scanning, therefore, speedup and density growth can be realized, and furthermore, a wide effective scanning width can be secured, therefore, generation of ghost light can be suppressed.

A plurality of beams emitted from the light sources 1 and 1' explained in FIG. 1 form two scanning lines by one time of scanning on the two different photoconductors. At this time, it is necessary to adjust the pitch in a sub-scanning direction of the scanning lines according to pixel density. As a method often used as a pitch adjusting method, a method for rotating a light source unit (1, 1', 2, 3, and 3' are provided as one unit) around an axis vertical to the main scanning direction and sub-scanning direction can be mentioned. However, in this case, although a desirable pitch can be provided in one photoconductor, for the other photoconductor, a pitch error is generated by a shape error of optical elements after the light flux splitter, and/or an error in the attachment thereof, and the like.

For solving this inconvenience, it is necessary to dispose a means for adjusting the pitch in a sub-scanning direction between the light flux splitter and deflecting unit.

Figure 7A:
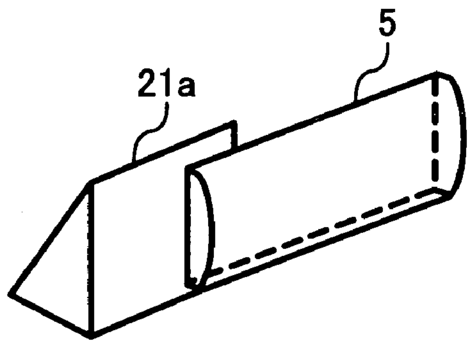
FIG. 7A and FIG. 7B are views showing examples of pitch adjusting units.
Figure 7B:
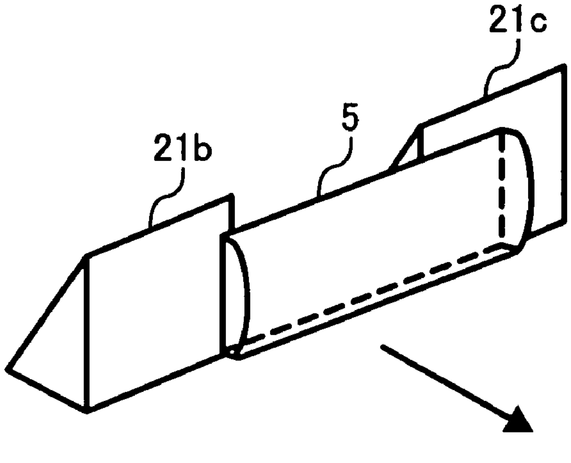

FIGS. 7A and 7B are views showing examples of pitch adjusting units. FIG. 7A is a view showing a one-side adjustment, and FIG. 7B is a view showing a both-side adjustment.

As one of the examples, a cylindrical lens 5 is mounted on a housing via intermediate members 21*a* to 21*c*. On respective mounting surfaces, a curing resin (for example, light curing) is applied in advance. At this time, 21*a* to 21*c* allow an "eccentric adjustment around an axis parallel to the main scanning direction" and an "adjustment in the optical axis direction" with respect to the housing, the cylindrical lens 5 allows an "eccentric adjustment around an axis parallel to the optical axis" and an "arrangement adjustment in a sub-scanning direction" with respect to the intermediate member, and at least one of the directions in which the intermediate member can be adjusted with respect to the housing and at least one of the directions in which the cylindrical lens 5 can be adjusted with respect to the intermediate member 21 are different. By a construction as such, a plurality of optical characteristics (an increase in the beam-waist diameter, a reduction in beam-waist displacement, and a reduction in beam-spot disposition) can be simultaneously secured, and also, by making it possible to adjust the cylindrical lens 5 around an axis parallel to the optical axis, a scanning line interval in the sub-scanning direction can be optimally set. In addition, of the intermediate member 21*a*, a surface that makes contact with the cylindrical lens 5 and a surface that makes contact with the housing are provided as flat surfaces, which simplifies adjustment. By curing the curing resin by a predetermined method (for example, ultraviolet irradiation) after the completion of an adjustment, a mutual position is fixed.

Figure 8A:
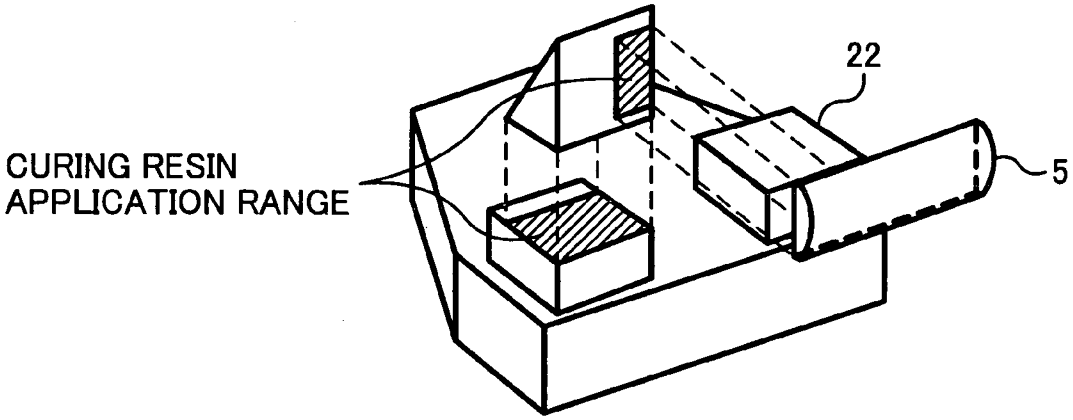
FIG. 8A and FIG. 8B are views for explaining actual adjusting methods.
Figure 8B:
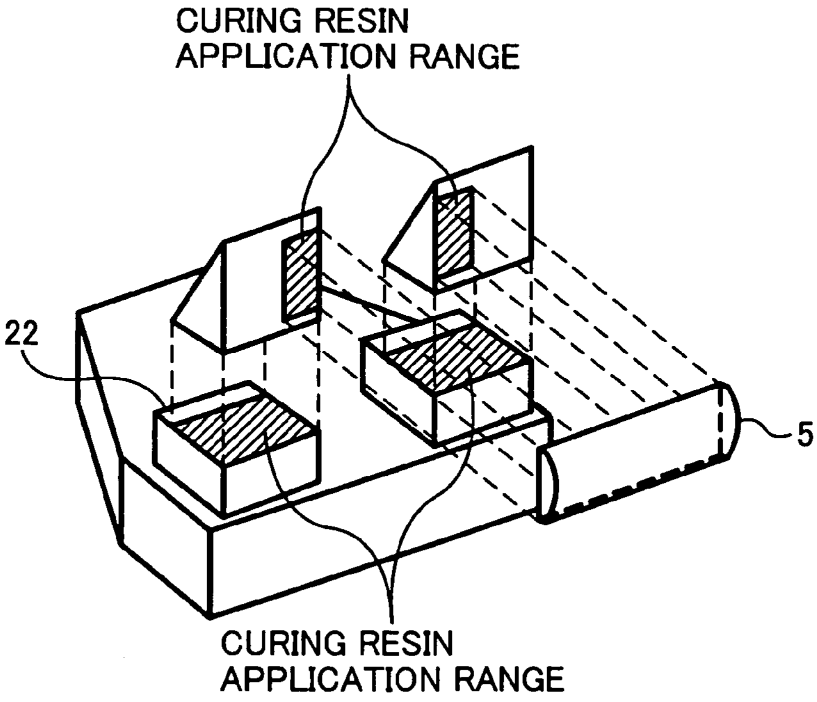

FIGS. 8A and 8B are views for explaining actual adjusting methods. FIG. 8A is a view showing a one-side adjustment, and FIG. 8B is a view showing a both-side adjustment.

The cylindrical lens 5 is held by a jig in advance, and the cylindrical lens 5 is then shifted in directions to be adjusted (namely to a position in the direction of an optical axis, an eccentricity around an axis parallel to the optical axis, and to a position in the sub-scanning direction). Then, the intermediate member 21 to which an ultraviolet curing resin has been applied is pressed against the cylindrical lens 5 and housing, and ultraviolet rays are irradiated to cure the cylindrical lens. By such a construction, it becomes possible to simply carry out an adjustment in a plurality of directions by a simple structure. Herein, by providing a transparent intermediate member 21, fixation by an ultraviolet curing resin is further simplified. Although it is possible to hold the optical element by use of a single intermediate member 21*a* as shown in FIG. 7A, it is also possible to dispose a plurality of intermediate members 21*b* and 21*c* at mutually opposite sides across light beams, and by such a construction, when, for example, the housing and intermediate member 21 (assumed to be a resin) are different in linear expansion coefficient, since a stress is generated to the optical axis symmetrically with respect to the optical element even if a rise in temperature occurs, a change in posture of the optical element is reduced.

Usually, a semiconductor laser used for an image forming apparatus performs auto power control (APC) to stabilize optical output. APC means a system that monitors an optical output from a semiconductor laser by a light-receiving element and controls, based on a detection signal of a received-light current proportional to the optical output from the semiconductor laser, a forward current of the semiconductor laser to a desirable value.

When the semiconductor laser is an edge-emitting semiconductor laser, as the light-receiving element, a photodiode that monitors light emitted in a direction opposite to the direction of an emission toward coupling lenses is often used, however, the amount of light received by the light-receiving element is increased if unnecessary ghost light enters when APC is performed.

For example, when an incidence angle of a beam on the upper-tier reflecting mirror is 0, since a reflecting surface of the reflecting mirror is facing in a light-source direction, if APC is performed at this position, a beam reflected by the upper tier returns to the light source, and the amount of light detected by the light-receiving element is increased. Therefore, a laser output from the lower-tier reflecting mirror that is carrying out writing results in an emitting output less than that aimed at, whereby image density is lowered and unevenness in density occurs. Similarly, when an incidence angle of a beam on the lower-tier reflecting mirror becomes 0, a similar problem arises in regard to a laser output from the upper-tier reflecting mirror.

Accordingly, a setting is provided so that neither reflecting mirror performs APC when the incidence angle is 0. Employment of this construction allows an image output at an appropriate concentration with less unevenness in concentration.

Figure 9:
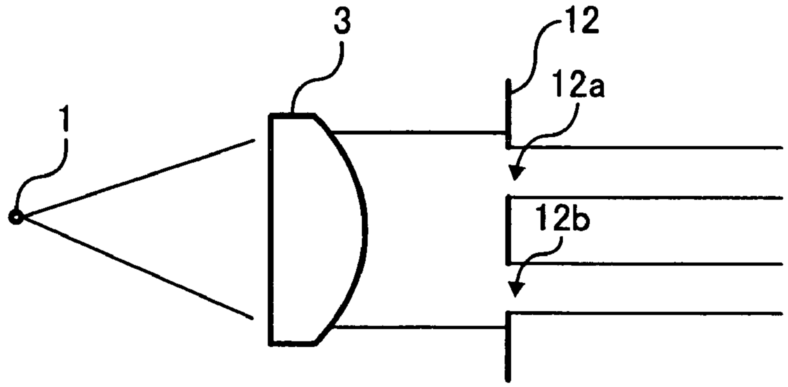
FIG. 9 is a sub-scanning sectional view showing another embodiment for separating beams.
Figure 10:
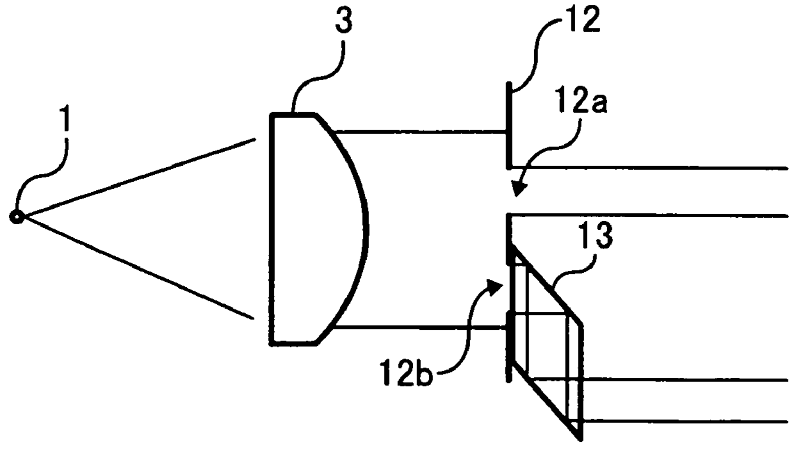
FIG. 10 is a sub-scanning sectional view showing another embodiment for separating beams.

FIG. 9 and FIG. 10 are sub-scanning sectional views showing other embodiments for separating beams.

In the same figure, reference numeral 13 denotes a prism.

The figures respectively show the light source 1 to the aperture stop 12. Beams emitted from the coupling lens 3 pass through a plurality of aperture stops 12$a$ and 12$b$ separated into top and bottom in the sub-scanning direction. Thereby, since it becomes possible to separate a light flux without using a half-mirror, the light amount can be easily secured, and furthermore, a decline in cost and a reduction in the number of components can be realized.

FIG. 9 is an example where the aperture stops 12$a$ and 12$b$ are separated for a distance equivalent to a gap between the polygon mirrors, while in FIG. 10, both aperture stops are close at an interval narrower than the above, and one of the light fluxes travels through the prism 13 after exiting the aperture, thereby an interval equal to a gap between the polygon mirrors is given. Since the construction of FIG. 10 can utilize a part of the light flux closer to the center than in the construction of FIG. 9, this leads to an increase in the light amount.

Figure 11:
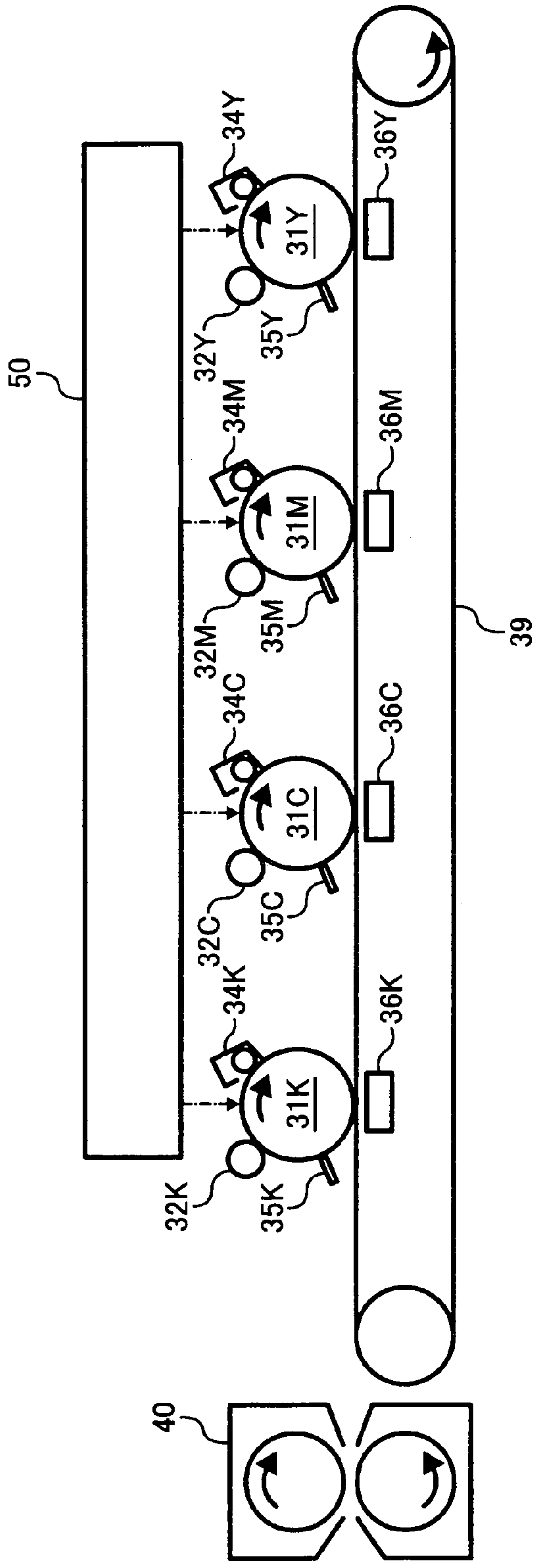
FIG. 11 is a view showing a basic configuration of a multicolor image forming apparatus.

FIG. 11 is a view showing a basic configuration of a multicolor image forming apparatus.

In the same figure, reference numerals 31Y, 31M, 31C and 31K each denotes a photoconductor, reference numeral 32Y, 32M, 32C and 32K each denotes a charger, reference numeral 34Y, 34M, 34C and 41K each denotes a developing unit, reference numeral 35Y, 35M, 35C and 35K each denotes a cleaning unit, reference numerals 36Y, 36M, 36C and 36K each denotes a charging unit for transfer, reference numeral 39 denotes a transfer belt, reference numeral 40 denotes a fixing unit, and reference numeral 50 denotes a writing unit. Reference symbols Y, M, C, and K stand for image colors, which show yellow, magenta, cyan, and black, respectively.

Photoconductors 31Y, 31M, 31C, and 31K rotate in the direction shown by arrows, and in the order of rotation, chargers 32Y, 32M, 32C, and 32K, developing units 34Y, 34M, 34C, and 34K, charging units 36Y, 36M, 36C, and 36K for transfer, and cleaning units 35Y, 35M, 35C, and 35K are disposed.

The chargers 32Y, 32M, 32C, and 32K are charging members that compose a charging device for uniformly charging the photoconductor surfaces. On the photoconductor surfaces between these chargers and developing units 34Y, 34M, 34C, and 34K, beams are irradiated by the writing unit, whereby electrostatic latent images are formed on the photoconductors. Then, based on the electrostatic latent images, toner images are formed on the photoconductors by the developing units. Furthermore, by the charging units 36Y, 36M, 36C, and 36K for transfer, transferred toner images of respective colors are transferred in sequence to a recording paper (not shown), and finally, images are fixed to the recording paper by the fixing unit 40.

Implementation data of the optical system is shown in the following.

Light source wavelength: 655 nanometers

Coupling lens focal length: 15 millimeters

Coupling effect: collimating effect

Polygon mirrors

With number of deflecting reflection surfaces: 4 inscribed circle radius: 7 millimeters, a difference $\phi$ in angles between the upper and lower tiers is 45(degrees)=45×π/180(radians)

Average incidence angle on the reflecting mirrors $$\alpha=28.225(\text{deg})=\pi\times 28.225/180(\text{rad})$$

$$\alpha'=29.775(\text{deg})=\pi\times 29.775/180(\text{rad})$$

In addition, cylindrical lenses having a focal length of 110 millimeters have been disposed between the light flux splitting unit and deflecting unit, which form line images elongated in the main scanning direction in the vicinity of the reflecting mirrors.

Lens data after the deflector is shown in the following.

A first surface of the first scanning lens and both surfaces of the second scanning lens are expressed by the following expressions (6) and (7).

Main Scanning Non-Arc Expression

A surface shape in a main scanning surface is a non-arc shape, and when a paraxial radius of curvature in the main scanning surface on the optical axis is provided as Rm, a distance in the main scanning direction from the optical axis is provided as Y, a conical constant is provided as K, and higher-order coefficients are provided as A1, A2, A3, A4, A5, A6 . . . , then a depth in the optical axis direction is expressed as X by the following polynomial expression.

$$X=(Y^2/Rm)/[1+\sqrt{\{1-(1+K)\,(Y/Rm)^2\}}+\ldots+A1.Y^2+A2.Y^2+A3.Y^3+A4.Y^4+A5.Y^5+A6.Y^6+\ldots \quad (6)$$

Here, when a numerical value other than zero is substituted for the odd-order coefficients A1, A3, A5 . . . , the surface has a non-symmetrical shape in the main scanning direction.

First, second, and third examples all use only even-order coefficients, and the shapes are symmetrical in the main scanning direction.

Sub-Scanning Curvature Expression

An expression where a sub-scanning curvature changes according to the main scanning direction is shown by (7).

$$Cs(Y)=1/Rs(O)+B1.Y+B2.Y^2+B3.Y^3+B4.Y^4+B5.Y^5+\ldots \quad (7)$$

Here, when a numerical value other than zero is substituted for odd-order coefficients B1, B3, B5 . . . of Y, the radius of curvature in the sub-scanning direction becomes asymmetrical in the main scanning direction.

In addition, a second surface of the first scanning lens is a rotation-symmetrical aspherical surface and is expressed by the following expression.

Rotation-Symmetrical Aspherical Surface

Where a paraxial radius of curvature on the optical axis is provided as R, a distance in the main scanning direction from the optical axis is provided as Y, a conical constant is provided as K, and higher-order coefficients are provided as A1, A2, A3, A4, A5, A6 . . . , a depth in the optical axis direction is expressed as X by the following polynomial expression.

$$X=(Y2/R)/(1+\sqrt{\{1-(1+K)\,(Y/Rm)^2\}}+A1.Y+A2.Y^2+A3.Y^3+A4.Y^4+A5.Y^5+A6.Y^6+\dots \quad (8)$$

Shape of the first surface of the first scanning lens

Rm=−279.9, Rs=−61.
K −2.900000E+01
A4 1.755765E−07
A6 −5.491789E−11
A8 1.087700E−14
A10 −3.183245E−19
A12 −2.635276E−24
B1 −2.066347E−06
B2 5.727737E−06
B3 3.152201E−08
B4 2.280241E−09
B5 −3.729852E−11
B6 −3.283274E−12
B7 1.765590E−14
B8 1.372995E−15
B9 −2.889722E−18
B10 −1.984531E−19

Shape of the second surface of the first scanning lens

R=−83.6
K −0.549157
A4 2.748446E−07
A6 −4.502346E−12
A8 −7.366455E−15
A10 1.803003E−18
A12 2.727900E−23

Shape of the first surface of the second scanning lens

Rm=6950,Rs=110.9
K 0.000000+00
A4 1.549648E−08
A6 1.292741E−14
A8 −8.811446E−18
A10 −9.182312E−22
B1 −9.593510E−07
B2 −2.1.35322E−07
B3 −8.079549E−12
B4 2.390609E−12
B5 2.881396E−14
B6 3.693775E−15
B7 −3.258754E−18
B8 1.814487E−20
B9 8.722085E−23
B10 −1.340807E−23

Shape of the second surface of the second scanning lens

Rm=766,Ra=−68.22
K 0.000000+00
A4 −1.150396E−07
A6 1.096926E−11
A8 −6.542135E−16
A10 1.984381E−20

A12 −2.411512E−25
B2 3.644079E−07
B4 −4.847051E−13
B6 −1.666159E−16
B8 4.534859E−19
B10 −2.819319E−23

In addition, refractive indexes of the scanning lenses at a using wavelength are all 1.52724.

An optical arrangement is shown in the following.

Distance d1 from the deflecting surface to the first surface of the first scanning lens: 64 millimeters Center thickness d2 of the first scanning lens: 22.6 millimeters Distance d3 from the second surface of the first scanning lens to the first surface of the second scanning lens: 75.9 millimeters Center thickness d4 of the second scanning lens: 4.9 millimeters Distance d5 from the second surface of the second scanning lens to the scanning surface: 158.7 millimeters Moreover, soundproof glass and dust-proof glass having a refractive index of 1.514 and a thickness of 1.9 millimeters are arranged, and the soundproof glass has a tilt in the deflecting rotation plane by 10 degrees with respect to a direction parallel to the main scanning direction.

Although the dust-proof glass is unillustrated, this is disposed between the second scanning lens and scanning surface.

Figure 12A:
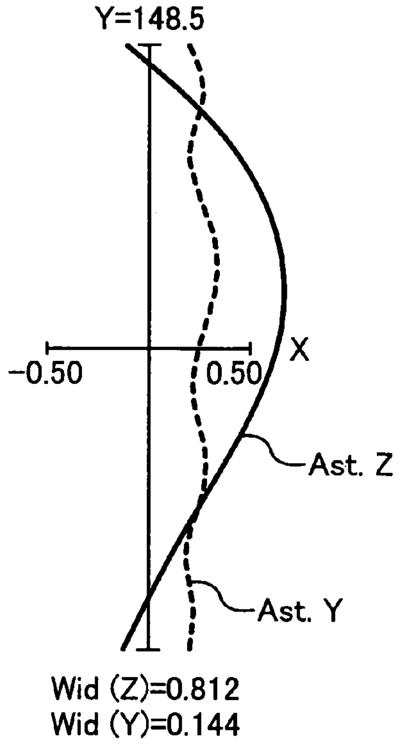
FIG. 12A, FIG. 12B, FIG. 12C, and FIG. 12D are aberration diagrams of light source images.
Figure 12B:
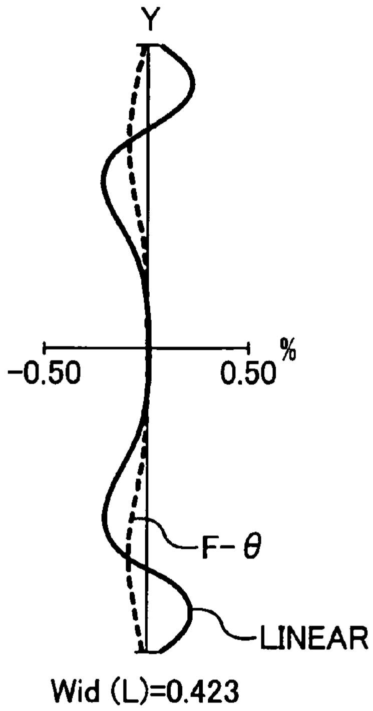
Figure 12C:
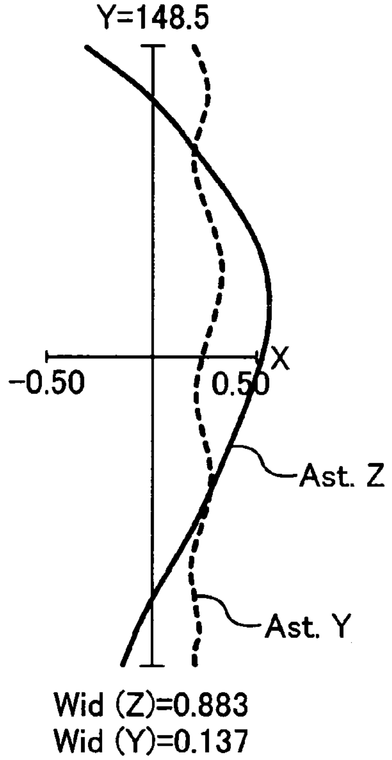
Figure 12D:
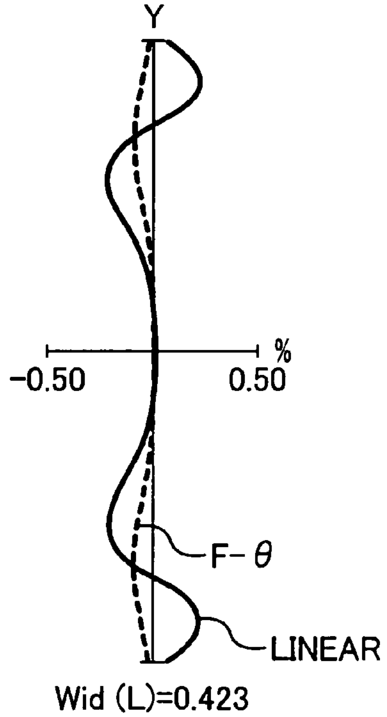

FIGS. 12A, 12B, 12C, and 12D are aberration diagrams of light source images. FIG. 12A and FIG. 12C are diagrams showing field curvatures, and FIG. 12B and FIG. 12D are diagrams showing speed uniformity. Moreover, FIG. 12A and FIG. 12B are diagrams showing characteristics concerning the light source 1, and FIG. 12C and FIG. 12D are diagrams showing characteristics concerning the light source 1'.

In FIG. 12A and FIG. 12C, the solid lines show field curvatures in the sub-scanning direction, and the broken lines show field curvatures in the main scanning direction. In FIG. 12B and FIG. 12D, the solid lines show linearity, and the broken lines show F-θ characteristics.

All curves show satisfactorily corrected conditions.

Figure 13A:
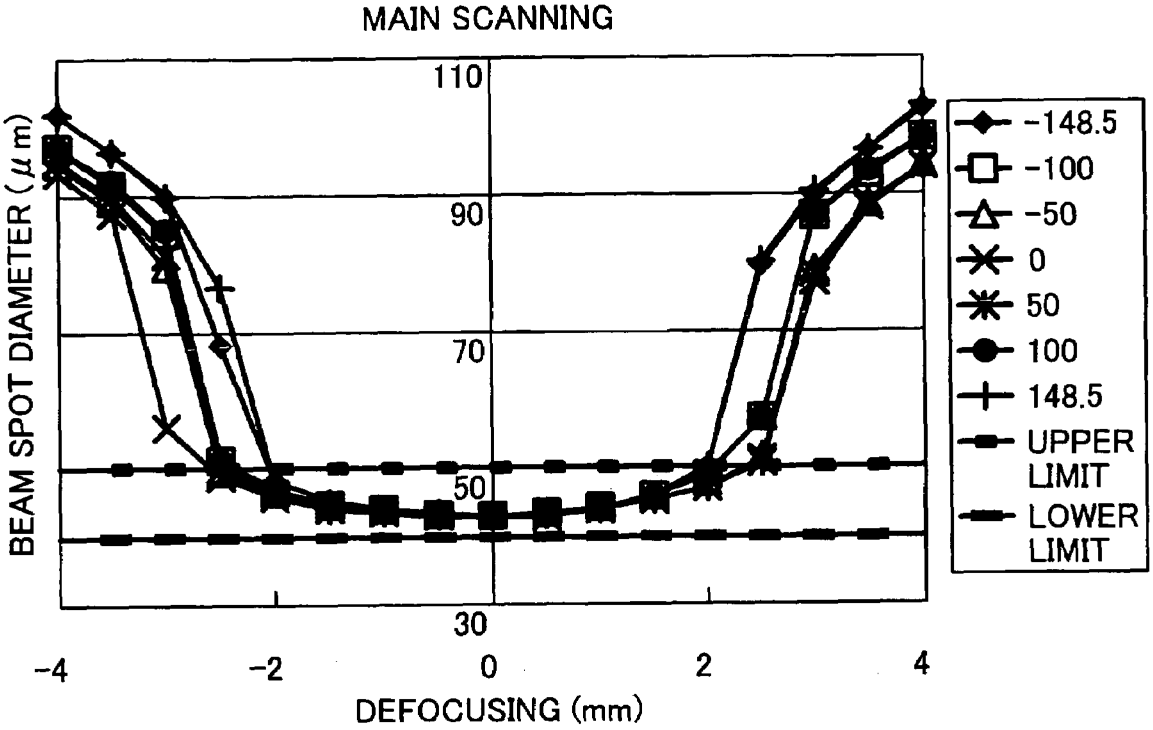
FIG. 13A and FIG. 13B are graphs showing beam spot changes at each image height resulting from defocusing.
Figure 13B:
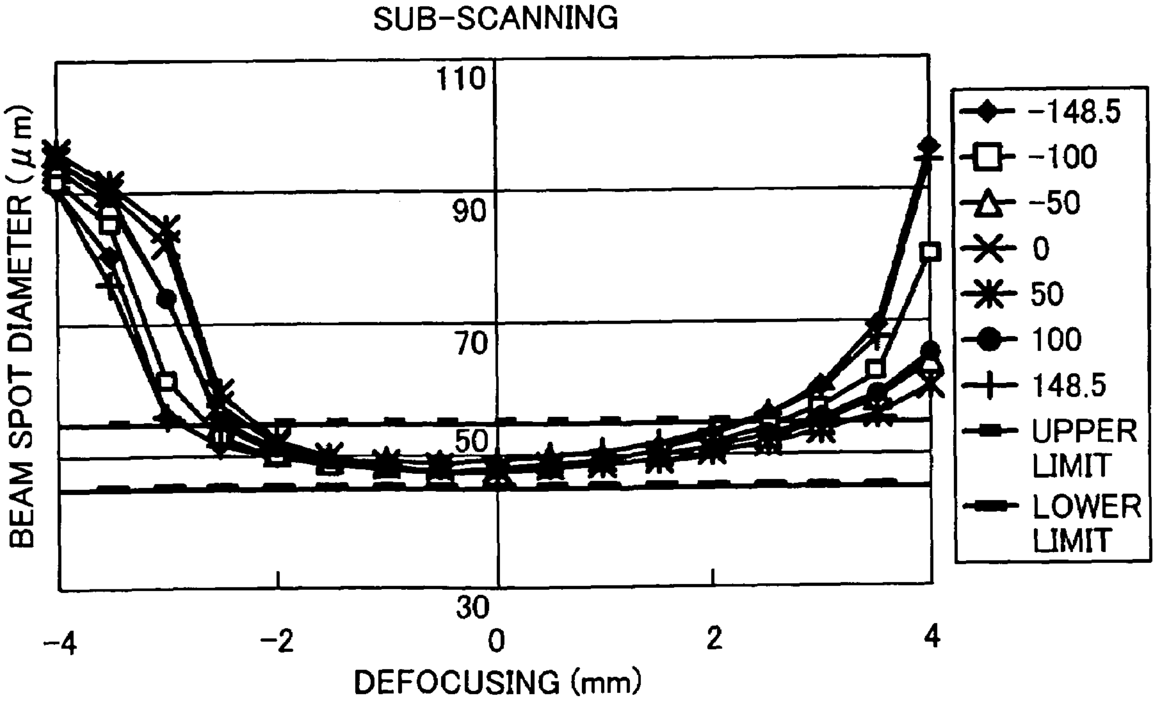
Figure 14A:
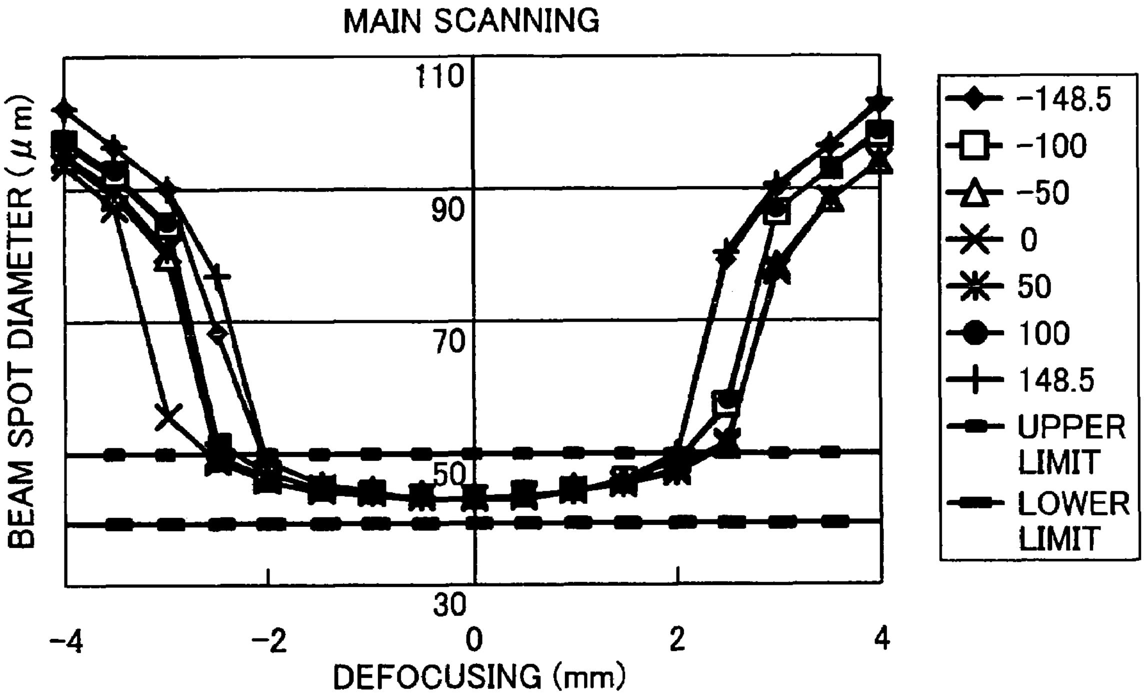
FIG. 14A and FIG. 14B are graphs showing beam spot changes at each image height resulting from defocusing.
Figure 14B:
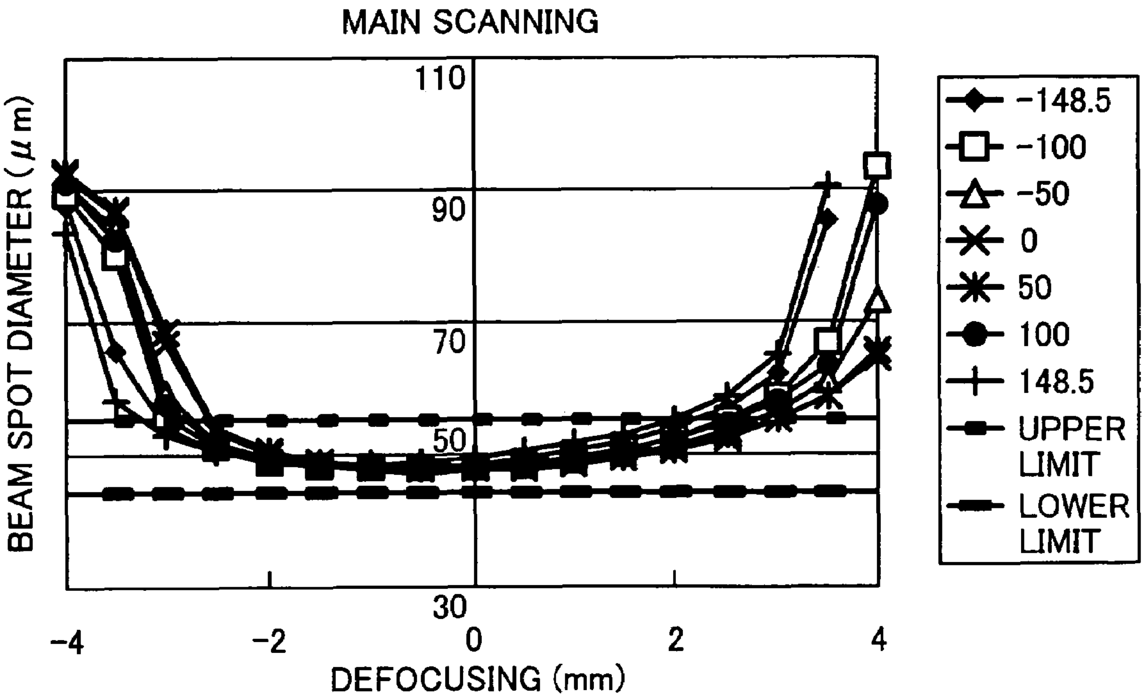

FIGS. 13A and 13B and FIGS. 14A and 14B are graphs showing beam spot changes at each image height resulting from defocusing. FIGS. 13A and 13B are graphs showing characteristics concerning the light source 1, and FIGS. 14A and 14B are graphs showing characteristics concerning the light source 1'. In both figures, FIGS. 13A and 14A each shows beam spot diameters in the main scanning direction, and FIGS. 13B and 14B each shows beam spot diameters in the sub-scanning direction. In the respective figures, the vertical axis indicates a beam spot diameter (unit: micrometers), while the horizontal axis indicates a defocusing amount (unit: millimeters).

The present data has been obtained on a condition where apertures having a main scanning width of 5.25 millimeters and a sub-scanning width of 2.14 millimeters are disposed between the coupling lenses and cylindrical lenses.

In the present example, beam light-receiving units are disposed on both the scanning start side and scanning end side, and an angle of view θ including the light-receiving units becomes $$79.4(\text{degrees})=79.4\times\pi/180(\text{radians})\approx 1.386(\text{radians}).$$

The respective parameters θ, M, ϕ, α, and α' used in the present example satisfy all conditional expressions (1) to (4).

In the present invention, although two beams are provided for scanning one photoconductor, only one of those beams may scan one photocondutor. Although only the illustration corresponding to two photoconductors has been disclosed in FIG. 1, by disposing an optical system similar to the illustrated optical system across the polygon mirrors, four photoconductors can be scanned.

By the present invention, even while the number of light sources is reduced, an optical scanning device which enables a high-speed and satisfactory image output can be provided. As a result, a reduction in the number of components and a decline in cost can be realized, whereby the failure probability of a unit as a whole is reduced, and recyclability is improved. Furthermore, a difference in quality between the beams that scan different photoconductor surfaces can be reduced.

A wide effective scanning width can be secured, therefore, it becomes possible to suppress generation of ghost light.

A plurality of scanning lines can be formed by one time of scanning on an identical scanning surface, therefore, speedup and density growth can be realized.

The scanning line interval in the sub-scanning direction on a scanning surface can be corrected with accuracy.

An image output at an appropriate concentration with less unevenness in concentration becomes possible.

Adjustment of the setting light amount allows an image output excellent in color reproducibility.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:

a plurality of light sources that are modulation-driven, each of which is made a common light source;

a deflecting unit having a plurality of tiers of multi-facet reflecting mirrors on a common rotation axis;

a light flux splitting unit that splits beams from the common light source and makes the split beams incident on mutually different tiers of reflecting mirrors of the deflecting unit;

a plurality of surfaces to be scanned;

a scanning optical system that guides the beams made to scan from the deflecting unit to the surfaces to be scanned; and light-receiving units that detect beams made to scan by the deflecting unit, so that the beams split from the common light source scan mutually different surfaces, wherein the mutually different tiers of multi-facet reflecting mirrors is shifted from each other in terms of angles in a rotating direction, and the following conditions are satisfied:

$$\theta/2<2\pi/M-\phi,$$

and $$\theta/2-\phi,$$

and $$\theta/2<2\alpha$$

wherein

θ: Angle of view including beams that reach the light-receiving units

α: Average incidence angle on the reflecting mirror at an effective scanning width ϕ: Angle shift in a rotating direction between the different tiers of multi-facet reflecting mirrors M: Number of faces of the multi-facet reflecting mirror.

2. The optical scanning device according to claim 1, wherein an amount of the angle shift in a rotating direction is equal to $\pi/M$.

3. The optical scanning device according to claim 1, wherein the split beams made incident on the mutually different tiers of reflecting beams are respectively composed of a plurality of beams, which form a plurality of scanning lines on each of the mutually different surfaces to be scanned.

4. The optical scanning device according to claim 3, further comprising a pitch adjusting unit that adjusts a pitch in a sub-scanning direction of the scanning lines formed on the surfaces to be scanned, and wherein said pitch adjusting unit is arranged between the light flux splitting unit and the deflecting unit.

5. The optical scanning device according to claim 1, wherein the light sources that are modulation-driven are edge-emitting semiconductor lasers, the optical scanning device has light-receiving units that monitor the light emitted in a direction opposite to the direction toward the deflecting unit; and a unit that automatically controls the light amount from the light sources, and when any of the split beams into the reflecting mirrors do not have an incidence angle of 0, an automatic light amount control is performed.

6. The optical scanning device according to claim 1, wherein when the common light source scans mutually different surfaces to be scanned, light amounts different from each other are set for the respective surfaces to be scanned.

7. An image forming apparatus comprising an optical scanning device, the optical scanning device including:

a plurality of light sources that are modulation-driven, each of which is made a common light source;

a deflecting unit having a plurality of tiers of multi-facet reflecting mirrors on a common rotation axis;

a light flux splitting unit that splits beams from the common light source and makes the split beams incident on mutually different tiers of reflecting mirrors of the deflecting unit;

a plurality of surfaces to be scanned;

a scanning optical system that guides the beams made to scan from the deflecting unit to the surfaces to be scanned; and light-receiving units that detect beams made to scan by the deflecting unit, so that the beams split from the common light source scan mutually different surfaces, wherein the mutually different tiers of multi-facet reflecting mirrors is shifted from each other in terms of angles in a rotating direction, and the following conditions are satisfied:

$$\theta/2<2\pi/M-\phi,$$

and $$\theta/2-\phi,$$

and $$\theta/2<2\alpha$$

wherein

θ: Angle of view including beams that reach the light-receiving units

α: Average incidence angle on the reflecting mirror at an effective scanning width φ: Angle shift in a rotating direction between the different tiers of multi-facet reflecting mirrors M: Number of faces of the multi-facet reflecting mirror wherein the image forming apparatus has a plurality of image carriers corresponding to the respective surfaces to be scanned.

* * * * *

UNITED STATES PATENT AND TRADEMARK OFFICE

CERTIFICATE OF CORRECTION

PATENT NO. : 7,667,868 B2
APPLICATION NO. : 11/364073
DATED : February 23, 2010
INVENTOR(S) : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-eighth Day of December, 2010

David J. Kappos
*Director of the United States Patent and Trademark Office*